United States Patent [19]
Calderon

[11] 3,932,373
[45] Jan. 13, 1976

[54] POLYMERIC MATERIALS DERIVED FROM RING-OPENING POLYMERIZATION OF 1,5-CYCLOOCTADIENE

[75] Inventor: Nissim Calderon, Akron, Ohio

[73] Assignee: The Goodyear Tire & Rubber Company, Akron, Ohio

[22] Filed: Mar. 4, 1974

[21] Appl. No.: 448,149

Related U.S. Application Data

[63] Continuation-in-part of Ser. No. 272,612, July 17, 1972, abandoned, which is a continuation-in-part of Ser. No. 145,953, May 21, 1971, abandoned, which is a continuation of Ser. No. 785,032, Dec. 10, 1968, abandoned, which is a continuation of Ser. No. 477,035, Aug. 3, 1965, abandoned, which is a continuation-in-part of Ser. No. 448,872, April 16, 1965, abandoned.

[52] U.S. Cl............................. 260/93.1; 260/94.3
[51] Int. Cl.² ........................................ C08F 132/06
[58] Field of Search .......... 260/93.1, 94.3; 450/744

[56] References Cited
UNITED STATES PATENTS

| | | | |
|---|---|---|---|
| 3,074,918 | 1/1963 | Eleuterio | 260/93.1 |
| 3,431,248 | 3/1969 | Kanbara et al. | 260/94.3 |
| 3,459,725 | 8/1969 | Natta et al. | 260/93.1 |
| 3,728,325 | 4/1973 | Carlson et al. | 260/94.3 |

OTHER PUBLICATIONS

*The Structure of Polymers*, Miller (1966) pp. 400, 401, 423.

Makro, Chem., 69, 163–169 (1963).

Primary Examiner—Stanford M. Levin
Attorney, Agent, or Firm—F. W. Brunner; J. Y. Clowney

[57] ABSTRACT

These polymers are characterized as having a structure of polyalkenemers in which the double bonds are of the cis and trans vinyl type configuration and no double bonds are of the 1,2 type configuration. The polymers are further characterized by repeating units of

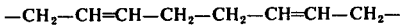

$-CH_2-CH=CH-CH_2-CH_2-CH=CH-CH_2-$ in which at least 75 percent of the vinyl double bonds are of the cis type configuration and none of the double bonds are of the 1,2-type configuration.

4 Claims, No Drawings

POLYMERIC MATERIALS DERIVED FROM RING-OPENING POLYMERIZATION OF 1,5-CYCLOOCTADIENE

This application is a continuation-in-part of Ser. No. 272,612 filed July 17, 1972, now abandoned, which was a continuation-in-part of Ser. No. 145,953 filed May 21, 1971, now abandoned, which was a continuation of Ser. No. 785,032 filed Dec. 10, 1968, now abandoned, which was a continuation of Ser. No. 477,035 filed Aug. 3, 1965, now abandoned, which was a continuation-in-part of Ser. No. 448,872 filed Apr. 16, 1965, now abandoned. This invention relates to polymers derived from unsaturated alicyclic compounds and to their preparation. More particularly, it relates to polymers derived from unsaturated alicyclic compounds that contain two carbon-to-carbon double bonds and eight carbon atoms in their rings and to their preparation.

In accordance with this invention, it has been found that polymeric materials can be produced from unsaturated alicyclic compounds which contain one alicyclic ring, said ring containing eight carbon atoms, and having two carbon-to-carbon double bonds in the alicyclic ring by subjecting the alicyclic compound to polymerization in the presence of a catalyst system which comprises at least one organometallic compound of metals selected from Groups Ia, IIa, IIb and IIIa of the Periodic Table of the Elements, and at least one salt of metals selected from Group VIb of the Periodic Table of the Elements. The Periodic Table of the Elements referred to in this application may be found in the Handbook of Chemistry and Physics, 44th Edition, April, 1962 Reprint, Page 448, published by the Chemical Rubber Publishing Co., Cleveland, Ohio, U.S.A.

Representative examples of metals from which the organometallic compound can be derived are lithium, sodium, potassium, rubidium, cesium, beryllium, magnesium, calcium, strontium, barium, radium, zinc, cadmium, mercury, aluminum, gallium, indium and thallium. The preferred organometallic compounds are compounds of lithium, sodium, magnesium, aluminum, gallium, indium, zinc and cadmium.

Representative examples of organometallic compounds are aluminum compounds having at least one aluminum to carbon bond, which are, for example, trialkylaluminums such as trimethylaluminum, triethylaluminum, tri-n-propylaluminum, tri-n-butylaluminum, triisobutylaluminum, trihexylaluminum, trioctylaluminum and the like; dialkylaluminum halides such as diethylaluminum chloride, di-n-propylaluminum chloride, diisobutylaluminum chloride, diethylaluminum bromide, diethylaluminum iodide and the like; alkylaluminum dihalides such as ethylaluminum dichloride, ethylaluminum dibromide, ethylaluminum diiodide and the like; dialkylaluminum hydrides such as diethylaluminum hydride, di-n-propylaluminum hydride, dibutylaluminum hydride and the like; the triarylaluminums such as triphenylaluminum and the like; the arylaluminum hydrides and dihydrides such as diphenylaluminum hydride and phenylaluminum dihydride. Other organometallic compounds, particularly those capable of reducing a Group VIb metal salt to a lower valence state may also be used. Representative of such organometallic compounds are alkyllithium compounds such as ethyllithium, butyllithium and the like; lithium aluminum tetraalkyls such as lithium aluminum tetrabutyl, lithium aluminum tetraethyl and the like; alkali metal alkyls and aryls such as amylsodium, phenyllithium and the like; alkyls and aryls of Group IIa metals such as diphenylmagnesium, diethylcalcium and the like; alkyls of Group IIb metals such as diethylzinc, diethylcadmium and the like; and Grignard agents such as phenyl magnesium bromide and the like. Mixtures of these compounds may also be employed, if desired. It is usually preferred to employ trialkylaluminums such as triethylaluminum, tri-n-propylaluminum, triisobutylaluminum, trihexylaluminum and the like.

The metal salts employed in the catalyst of this invention are salts of metals of Group VIb of the Periodic System and include chromium salts, molybdenum salts and tungsten salts. Representative of such salts include halides such as chlorides, bromides, iodides and fluorides, which include compounds such as chromium dichloride, chromium trichloride, chromium hexachloride, molybdenum pentachloride, molybdenum hexachloride, tungsten hexachloride, chromium dibromide, chromium tribromide, chromium hexabromide, molybdenum pentabromide, molybdenum hexabromide, tungsten hexabromide, chromium diiodide, chromium triiodide, chromium hexaiodide, molybdenum pentaiodide, molybdenum hexaiodide, tungsten hexaiodide, chromium difluoride, chromium trifluoride, chromium hexafluoride, molybdenum pentafluoride, molybdenum hexafluoride, and tungsten hexafluoride. Other representative salts are those of acetates, benzoates, acetylacetonates, sulphates and the like which include compounds such as chromium acetate, molybdenum acetate, tungsten acetate, chromium benzoate, molybdenum benzoate, tungsten benzoate, chromium acetylacetonate, molybdenum acetylacetonate, tungsten acetylacetonate, chromium sulphate, molybdenum sulphate and tungsten sulphate. Mixtures of these salts may also be employed. Of these, it is usually preferred to employ tungsten halides and molybdenum halides representative of which are tungsten hexachloride and molybdenum pentachloride.

The unsaturated alicyclic compound useful in this invention is 1,5-cyclooctadiene. The polymers produced from the ring-opening polymerization of 1,5-cyclooctadiene may be characterized as having a structure of polyalkenamers in which the double bonds are of the cis and trans vinylene type configuration. These polymers do not contain any of the double bonds which are of the 1,2 type configuration.

The polymers of this invention consist of repeating units of $-CH_2-CH=CH-CH_2-CH_2CH=CH-CH_2-$, and may be characterized as having the structure of polyalkenamers in which at least 75 percent of the vinylene double bonds are of the cis-type configuration. Since these polymers are produced by a ring-opening polymerization as opposed to the conventional addition type polymerization through the double bonds, they contain no double bonds of the 1,2 type configuration. The linear polyoctenamers formed from 1,5-cyclooctadiene by ring-opening polymerization are amorphous in nature.

The catalysts of this invention are prepared by mixing the components by well-known techniques. No particular order of mixing is required. The catalysts may be prepared by the "preformed" or "in-situ" techniques. By the preform method the catalyst components are mixed together prior to exposure of either component to the monomer to be polymerized. The in-situ method consists of adding the catalyst components to the monomer separately. The catalyst components may be mixed either as pure compounds, or as suspensions or solutions in liquids which do not adversely affect the polymerization.

The amount of catalyst employed in the polymerizations of this invention may be varied over wide concentrations and has not been found to be critical. Of course, a catalytic amount of the catalyst must be employed to cause polymerization of the monomer. The optimum amount of catalyst depends on a number of factors such as temperature, reactants used, purity of reactants, reaction times desired and the like. Those skilled in the art will readily determine the optimum catalytic ranges. While there is no maximum catalytic level, polymerizations can be conducted wherein the amount of total catalyst employed may range from about 0.001 to about 5.0 parts by weight per 100 parts by weight of monomer employed, although a range of from about 0.01 to about 1.0 is usually desirable, and a range of from about 0.05 to about 0.2 is usually more suitable. The term, total catalyst, is meant to include the weight of both the organometallic and the metal salt compounds. For example, good bulk polymerization rates have been obtained wherein a mixture of 0.05 parts by weight of tungsten hexachloride and 0.04 parts by weight of triisobutylaluminum was used to polymerize 100 parts by weight of cyclooctene.

In the catalyst composition the molar ratios of the organometallic compounds to the Group VIb metal salts can be varied over the range of from about 0.1/1 to about 30/1 or higher. However, a mol ratio of about 0.25/1 to about 15/1 is usually preferred. It will be recognized by those skilled in the art that the optimum molar ratio of the catalyst components may vary somewhat with the use of particular combinations of the catalyst components, the monomer being polymerized and the polymerization conditions. For example, in polymerizing cyclooctene with a catalyst comprising an admixture of a trialkylaluminum and tungsten hexachloride, it is usually preferred that the molar ratio of the aluminum compound to the metal salt is in the range of from about 0.4/1 to about 2.5/1.

The polymerizations of this invention may be conducted in solution or bulk. When the polymerization is carried out in solution, solvents which do not adversely affect the polymerization are desired. Representative of useful solvents are liquid aromatic hydrocarbons such as benzene and toluene; hydrogenated aromatic hydrocarbons such as tetralin; liquid aliphatic hydrocarbons such as pentane, heptane, hexane, petroleum ether, decane; and liquid cycloaliphatic hydrocarbons such as cyclohexane, decalin, and cyclooctane. Mixtures of such solvents may also be used.

Temperatures at which the polymerization reaction is carried out can be varied over a wide range. Usually the temperature can be varied from extremely low temperatures such as −60°C. up to high temperatures such as 100°C. or higher. Thus, the temperature is not a critical factor of the invention. It is generally preferred, however, to conduct the reaction at a temperature in the range of from about −20°C. to about 80°C. The pressure at which the polymerization is carried out can also be varied over a wide range. The reaction can be conducted at atmospheric pressure or, if desired, it can be carried out at sub-atmospheric pressure or super-atmospheric pressure. Generally, a satisfactory polymerization is obtained when the reaction is carried out at about autogenous pressure developed by the reactants under the operating conditions used.

The polymerization time will vary and can range from a few seconds to 24 hours or more, depending upon the polymerization conditions and the degree and extent of polymerization desired.

The polymerization reaction may be carried out as a batch or as a continuous process. In performing the polymerizations of this invention, the introduction of the monomer, catalyst and solvent, when a solvent is employed, can each be made to the reaction zone alternately, intermittently, and/or continuously.

The polymerization of the 1,5-cyclooctadiene of this invention takes place through a ring-opening polymerization mechanism. A ring-opening polymerization mechanism can be considered as one in which the double bonds are severed and these double bonds between the methylidene carbons in some manner reconnect to the opened double bond in other ring-open monomer molecules to form a high polymer which is linear.

The ring-opening polymerizataion of cyclooctadiene-1,5 leads to a polybutenamer which is equivalent to the 1,4-addition polymer of butadiene-1,3. Such a polybutadiene can be rubber-like and it can be prepared having no 1,2 or vinyl structure. In practicing this invention, polybutenamers can be formed whose structure comprises alternating cis- and trans-vinylene groups in successive polymeric repeat units which is equivalent to the polymer which may be obtained by the 1,4-addition polymerization of butadiene-1,3 in which successive butadiene-1,3 units alternately occur in cis- and trans- configurations. Such a polymer could be considered an alternating copolymer of cis- and trans-1,4 poly(butadiene-1,3).

The ring-opening polymerization of 1,5-cyclooctadiene would yield a polybutenamer having no double bonds of the 1,2-configuration, rather, all the double bonds of said polymer are of a 1,4-configuration. These double bonds may have about 20 to about 90 percent cis-1,4 configuration with the remainder of trans 1,4 or a polybutenamer having from about 20 to about 75 or 80 percent of the 1,4-configuration in cis-1,4 configuration and having no 1,2-configuration.

Ring-opening polymerization of 1,5-cyclooctadiene produces high molecular weight polymers which have superior resistance to oxidative aging.

Bulk polymerizations may be desirable from a process standpoint as relatively little heat appears to be evolved per mole of cycloolefin polymerized in practicing this invention. This constitutes a great advantage for this ring-opening type of polymerization over conventional addition polymerization.

The low volume decrease accompanying a ring-opening polymerization is another major advantage over conventional addition polymerization, particularly where 1,5-cyclooctadiene is bulk polymerized to form potting compounds and various articles, examples of which are molded plastic materials, molded rubber-like goods, shoe soles and heels, industrial belts, and vehicle tires.

In these applications the monomer may be polymerized in the presence of one or more reinforcing carbon blacks, pigments or resins and certain anti-oxidants. The products made by this procedure may be cross-linked by adding polymerizable polyfunctional cycloolefins, for example, bicyclopentadiene, to the main monomer. The molded products made by ring-opening polymerization may be crosslinked by exposure to ionizing radiation such as gamma rays, X-rays or electrons. These molded products may also be crosslinked or vulcanized by incorporating certain compounds which on heating during or subsequent to the polymerization will lead to conventional crosslinking or vulcanization of these polymers. One skilled in the art may, by a suitable selection of polymerization conditions, use the catalyst or by-products of the catalyst preparation to crosslink the polymer formed in the shape of a finished article.

The polymerization reaction may be controlled by incorporating various compounds which upon heating release materials which deactivate the catalyst. Representative examples of such compounds are the ammonia salts such as ammonium chloride, ammonium carbonate, ammonium acetate, ammonium oleate, ammonium sulphate, and ammonium phosphate; other ammonia-releasing compounds such as tetraalkyl ammonium halides, e.g., tetramethyl ammonium chloride; water-releasing agents such as salts with water of crystallization, examples of which are, $Al_2(SO_4) \cdot 17H_2O$, $NH_4Al(SO_4)_2 \cdot 12H_2O$, $FeSO_4 \cdot 7H_2O$, $MgHPO_4 \cdot 7H_2O$, $KAl(SO_4)_2 \cdot 12H_2O$, $KNaCO_3 \cdot 6H_2O$, $Na_2B_4O_7 \cdot 10H_2O$, $Na_2CO_3 \cdot 10H_2O$, $Na_2HPO_4 \cdot 12H_2O$, $Na_2SO_4 \cdot 10H_2O$, and $ZnNO_3 \cdot 6H_2O$.

The following examples are set forth to further illustrate the nature of this invention. However, it should be understood that the examples are set forth for illustrative and not for limitative purposes. The parts and percentages are by weight unless otherwise indicated.

EXAMPLE I

A 4-ounce bottle was charged with 14.5 grams of 1,5-cyclooctadiene and 75 ml. pentane which had been passed as a mixture over a silica gel column under nitrogen atmosphere. About 10 ml. solvent was vented out before the bottle was capped and cooled to −20°C. 4.0 ml. of $WCl_6$ solution of a 0.1 M concentration in benzene was added to the bottle followed by 2.0 ml. 0.1 M solution of triisobutylaluminum in heptane at −20°C., and the polymeriztion was allowed to proceed at this temperature for 65 hours. The polymer cement was coagulated in a 1% solution of 2,6-ditertiary-butyl-para-cresol in methanol. After drying, 3.48 grams polymer were recovered which amounted to a 24% yield. The polymer was rubbery and had an inherent viscosity value of 0.69 deciliters per gram and 4.5% gel. The inherent viscosity of the polymer was determined on a solution of 0.1 grams of dry polymer in 100 ml. of benzene at 30°C. The gel content of the polymer was obtained by determining the percent of polymer which is insoluble when 0.1 gram of dry polymer is allowed to stand in 100 ml. of benzene for 2 days at 30°C.

The infra red analysis revealed that the polymer had a spectra identical to a polymer of butadiene-1,3 with a cis content of 78.9%, a trans content of 16.4% and a 1,2-vinyl content of less than 0.1%.

Thus, the example above illustrates the preparation of polymers containing repeating units of four carbon atoms each and each four carbon units containing one carbon-to-carbon double bond. These polymers also contain at least 75% of these units in a cis 1,4 structure and have less than 0.2 or 0.1% of these units in a 1,2 structure. Such polymers are considered a polybutadiene in which at least 75% of the units are in a cis 1,4 configuration and less than 0.2 or 0.1% of the units are in a 1,2 configuration. Such polymers are also considered a polybutadiene in which at least 90% of the units are in a 1,4 configuration and less than 0.2 or 0.1% of the units are in a 1,2 configuration.

While certain representative embodiments and details have been shown for the purpose of illustrating the invention, it will be apparent to those skilled in this art that various changes and modifications may be made therein without departing from the spirit or scope of the invention.

EXAMPLE II

Four solutions each containing 10.0 grams 1,5-cyclooctadiene, 40 ml hexane, and 0.1 gram 2,5-ditertiarybutyl-p-cresol antioxidant were dried and purified by treatment with an activated alumina-silica gel under nitrogen and placed in a constant temperature bath set at 0°C. A catalyst comprised of a solution of $WCl_6$ in chlorobenzene (0.05 M) in combination with a solution of ethylaluminum dichloride (EADC) in hexane (0.20 M) was employed. All polymerizations were carried out at 0°C. The relevant reaction parameters, conversions and the structures of the respective polymers are summarized in the following table. The polymerizations were short-stopped at the designated reaction times by addition of 0.5 ml methanol. Polymer cements were dried at 65°C under vacuum. The structure of the respective polybutenamers was determined by conventional infrared spectroscopy in $CS_2$ solutions.

| Reaction | $WCl_6$(mM) | EADC(mM) | Time (min) | Conv (%) | % Trans | % Cis | % 1,2 |
| --- | --- | --- | --- | --- | --- | --- | --- |
| 1 | 0.025 | 0.10 | 1.50 | 17.6 | 18.1 | 82.9 | 0 |
| 2 | 0.020 | 0.08 | 2.25 | 37.7 | 23.6 | 76.4 | 0 |
| 3 | 0.020 | 0.04 | 6.00 | 43.3 | 25.5 | 74.5 | 0 |
| 4 | 0.020 | 0.16 | 6.50 | 31.3 | 22.6 | 77.4 | 0 |

Thus, the example above illustrates the preparation of polymers of 1,5-cyclooctadiene prepared by ring-opening polymerization characterized by having a structure of polyalkenemers in which the double bonds are of the cis and trans type configuration and none of the double bonds are of the 1,2 type configuration. The example also illustrates the preparation of polymers consisting of repeating units of $-CH_2-CH=CH-CH_2-CH_2-CH=CH-CH_2-$ characterized by having the structure of polyalkenamers in which at least 75 percent of the vinylene double bonds are of the cis-type configuration and none of the double bonds are of the 1,2 type configuration.

While certain representative embodiments and details have been shown for the purpose of illustrating the invention, it will be apparent to those skilled in this art that various changes and modifications may be made therein without departing from the spirit or scope of the invention.

What is claimed is:

1. Rubbery homopolymers of 1,5-cyclooctadiene prepared by ring-opening polymerization of 1,5-cyclooctadiene, characterized by having a structure of polyalkenamers in which the double bonds are of the cis and trans vinylene type of configuration and none of the double bonds are of the 1,2 type configuration.

2. Rubbery homopolymers consisting of repeating units of $-CH_2-CH=CH-CH_2-CH_2-CH=CH-CH_2-$, characterized by having the structure of polyalkenamers in which at least 75 percent of the vinylene double bonds are of the cis type configuration and none of the double bonds are of the 1,2 type configuration.

3. A tire which comprises at least in part a rubbery homopolymer according to claim 1.

4. A tire which comprises at least in part a rubbery homopolymer according to claim 2.

* * * * *